Fig. 1.

Nov. 5, 1963 B. JENNINGS 3,110,024
VELOCITY-LOCKING SYSTEM
Filed July 27, 1950 3 Sheets-Sheet 2

INVENTOR
Burridge Jennings.
BY
ATTORNEY

United States Patent Office 3,110,024
Patented Nov. 5, 1963

3,110,024
VELOCITY-LOCKING SYSTEM
Burridge Jennings, Pittsburgh, Pa., assignor, by mesne assignments, to the United States of America as represented by the Secretary of the Navy
Filed July 27, 1950, Ser. No. 176,107
12 Claims. (Cl. 343—7)

This application is a continuation-in-part of my application Serial No. 788,485, filed November 28, 1947, now abandoned.

My invention relates to novel combinations and parts of a target-finding and target-locking system, and it has more particular relation to a continuous-wave (CW), frequency-modulated (FM), ultra-high-frequency carrier-current or radar system, using a directional antenna or antennas for aiming a wave or beam at the target and receiving a reflected echo-wave or beam from the target.

One application of my invention is in a continuous-wave radar-system, which will lock itself on a target, in azimuth, elevation, range, and velocity; which will track that target, giving continuous measurements of these four variables as long as the target is within the range of these variables as selected for the system. Another target will not interfere with the one being tracked, unless it has the same azimuth, elevation, range and velocity within known limits set by the system. The velocity to which I am referring is the radial or line-of-sight component of the target-velocity relative to the radar-system. Because of its fourfold locking, and novel features of its receiving-filters, my system is difficult to jam, either accidentally or on purpose, by other near-by equipment.

An object of my invention is to provide a range-finding radar-system in which it is possible to use sine-wave frequency-modulation of a continuous-wave carrier, thereby avoiding the very great limitations of either square-topped or triangularly shaped repetitive-wave modulation, or of intermittently interrupted transmission.

A further object of my invention is to provide a system in which the target is first locked in velocity, by the Doppler effect, using an unmodulated continuous wave, and then the transmitted wave is frequency-modulated and the target is locked as to range, after which the target is locked in azimuth and elevation.

A further object of my invention is to provide a range-locking radar-system which is featured by the use of a delay-line, which is connected into either the receiver-circuit or a feed-back circuit from the transmitter, in combination with a frequency-modulator in the transmitting system, either the delay-line or the modulating-frequency being variable, so as to synchronize the received wave with the feed-back transmitter-reference wave when the target is on range, the modulating frequency and the delay-line delay being so related that the one which is varied does not need to be varied over a range as great as 1-to-2, thus making it impossible for the system to synchronize the two waves (received wave and reference-wave) at any one but a single range, within the range-limit of the system.

The synchronization of the two waves, when the target is on range, is determined by means of a discriminator and a demodulator or phase-comparator. The discriminator picks out the modulator-frequency from the combined receiver and transmitter-reference wave, and the demodulator or phase-comparator compares the phase of this modulator-wave with the phase of the frequency-modulator variations which are impressed on the transmitter-wave, a 90° phase-shifter being interposed in either of the input-sides of the demodulator or phase-comparator. The demodulator or phase-comparator produces a direct-current output-voltage which varies in direction and magnitude in accordance with the phase-shift, thus providing a range-locking means.

A particular field of application of my invention is in connection with a velocity-locking radar-system in which it is possible to distinguish between an opening or closing velocity, that is, between a receding or approaching target. This object is accomplished by injecting a Doppler-reference heterodyne-signal into either the transmitter-reference signal or the receiver-signal, so that the Doppler effect will now be added or subtracted to this Doppler-reference frequency, so that it is possible to determine whether the Doppler frequency is the result of a receding or approaching target. This Doppler-reference frequency must be higher than the largest expectable Doppler frequency, and preferably the Doppler-reference frequency should be considerably higher than the largest expectable Doppler frequency, so that the discriminator can be tuned to the Doppler-reference frequency, with a preferable band-width sufficient to include the largest expectable Doppler frequency in either sideband.

A still further object of my invention is to provide a velocity-and-range-locking radar-system in which the Doppler-reference signal is the carrier-frequency which is left after the comparison of the receiver-signal with the transmitter-reference signal. Roughly speaking, this Doppler-reference carrier-frequency may be regarded as being shifted in frequency, in accordance with the Doppler effect, for measuring the relative radial velocity of the moving target, and being frequency-modulated by the sine-wave frequency-modulation which is imposed on the transmitted wave, so as to measure the range of the target. The injected Doppler-reference frequency must be large enough to conveniently handle both the frequency-variations or shifts due to the radial velocity of the target, and the necessary frequency-variations or deviations due to the range-correction.

With the foregoing and other objects in view, my invention consists in the circuits, systems, apparatus, combinations, parts, and methods of design and operation, hereinafter described and claimed, and illustrated in the accompanying drawings, wherein:

Figure 1:
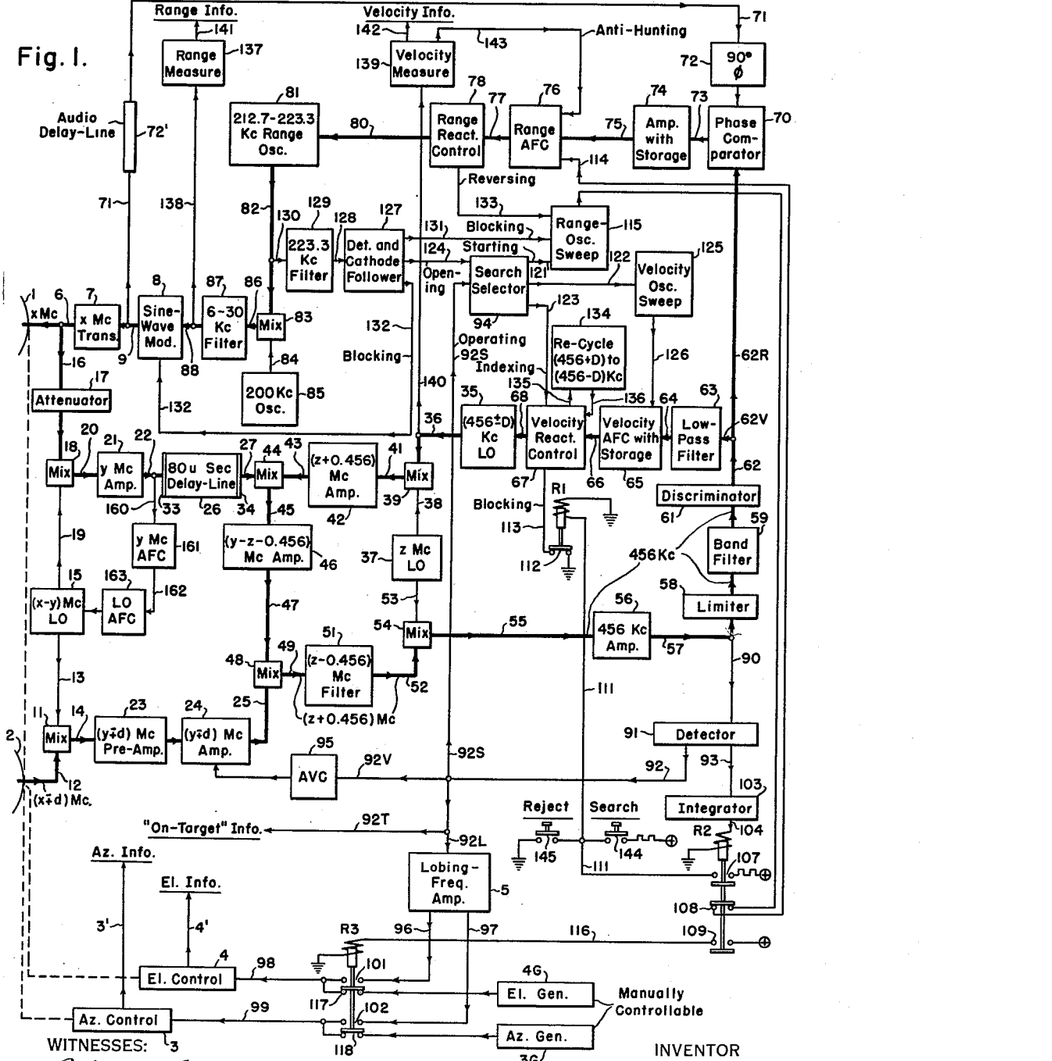
FIGURE 1 is a block-diagram of circuits and apparatus illustrating my invention in a preferred form of embodiment.

As shown in FIG. 1, my radar-system or apparatus uses any conventional directional antenna-system, which is illustrated, for convenience, as being of a type embodying separate transmitting and receiving antennas, as indicated at 1 and 2. This antenna-system is aimed by suitable azimuth and elevation control-devices 3 and 4, which may be either manually controlled, by means of azimuth and elevation generators 3G and 4G, respectively, or automatically controlled, as by means of a lobing-frequency servo-amplifier 5. Information as to the azimuth and elevation of the target at which the antenna-system is being aimed is obtained from the azimuth and elevation control-devices 3 and 4, by circuits 3' and 4', respectively.

An ultra-high frequency radar-wave of $x$ megacycles (mc.) is supplied to the transmitter-antenna 1 through a transmission-line 6 which is powered by a continuous-wave transmitter 7, which is frequency-modulated (FM) by means of a modulator 8 which is connected to the transmitter by an electrical connection 9. An advantage of my invention is that the frequency-modulation may have a sinusoidal wave-shape, as distinguished from either square-topped or triangular-shaped modulating-waves such as have heretofore been known, and I therefore very much prefer that the modulator 8 shall be a sine-wave modulator, because of the far greater simplicity and accuracy of means for generating a sine-wave, as compared to means for generating a wave of any other, or special, wave-shape. My invention, however, will operate with any wave-shape of the frequency-modulating wave.

The echo-signal which is received by the receiver-antenna 2 may be heterodyned to any convenient intermediate frequency, by means of a mixer or converter or frequency-comparing demodulator 11, which receives the echo-wave through a transmission-line 12, and mixes it with a heterodyning signal which is received from a line 13 to produce a mixture of these two waves (containing both the sum and the difference of the two frequencies) in the ouput-line 14 of the mixer 11. The heterodyning wave of the input-line 13 is obtained from a local-oscillator (LO) 15, which may operate at a fixed frequency of $(x-y)$ mc.

At the same time, a transmitter-reference signal is obtained from the transmission line 6 of the transmitter, by means of a tapped-off transmission-line 16 and an attenuator 17, which supplies the transmitter-frequency wave to a mixer or converter 18, which heterodynes this wave with the heterodyning wave of $(x-y)$ mc., through an input-line 19 powered from the same local-oscillator 15 which is used for heterodyning the receiver-wave. The heterodyned transmitter-reference wave, or feed-back wave, is obtained in the output-line 20 of the mixer or converter 18.

In the manner just described, I produce two waves, in the lines 20 and 14, from the transmitter and the receiver, respectively. The $y$ mc. part of the transmitter-reference wave is segregated, by an amplifier or filter 21, and delivered to a line 22, while the corresponding component of the receiver-wave is segregated by means of a pre-amplifier 23 and an amplifier 24, and delivered to a line 25. This segregated receiver-wave, in the line 25, has almost the same frequency as the transmitter-reference wave in the line 22, the difference being that the frequency of the receiver-wave is modified by the Doppler effect, which adds or subtracts a small frequency-increment of $d$ mc., so that the receiver-line 12 carries a frequency of $(x \mp d)$ mc., while the receiver-line 25 carries a frequency of $(y \mp d)$ mc.

If the line-of-sight or radial velocity of the target, relative to the radar-equipment, is $u$ centimeters per second, and if the frequency of the transmitted wave is $x$ mc., the Doppler frequency is $$d = \pm \tfrac{2}{3} u x \times 10^{-10} \text{ mc.} \qquad (1)$$

Figure 2:
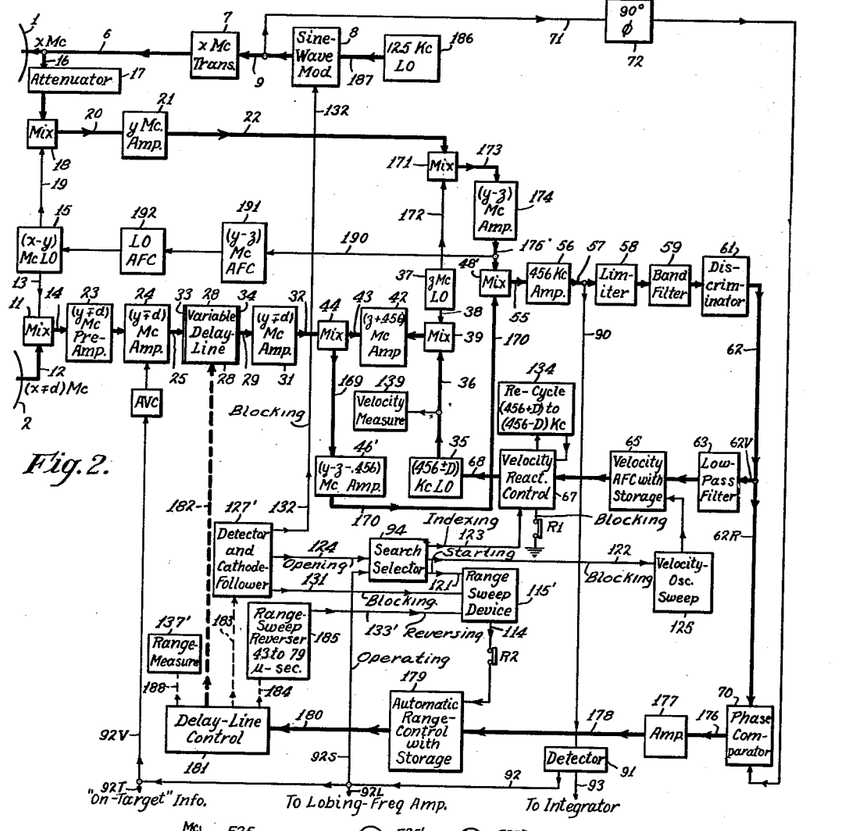
FIG. 2 is a similar diagram showing modifications.

In accordance with my invention, a delay-line is interposed in either the transmitter-reference line 22 or the receiver-wave line 25, so as to interpose a certain time-delay which is predetermined, depending upon the maximum range of the apparatus. In FIG. 1, a delay-line 26 is interposed between the transmitter-reference line 22 and a transmitter-reference line 27. In FIG. 2, a delay-line 28 is interposed between the receiver-line 25 and a receiver-line 29, and an additional amplifier 31 is added, for increasing the energy-level which is supplied to a receiver-line 32.

In accordance with my invention, I may use either a fixed delay-line and a variable modulating-frequency which is applied to the sine-wave modulator 8, or a variable delay-line and a fixed modulator-frequency. In FIG. 1, the delay-line 26 is fixed, that is, it has a fixed or constant time-delay. In FIG. 2, the delay-line 28 is illustrated, by way of example, as being variable.

A delay-line may consist of a driving-crystal 33, sending supersonic impulses through a solid or liquid medium to a receiving-crystal 34, the delay-line time being the time required for the supersonic impulses to travel through the connecting medium between the two crystals. In a variable delay-line, such as that which is diagrammatically indicated by the block 28 in FIG. 2, the driving and receiving crystals may be separated by a liquid, such as mercury, and may be mechanically movable toward and away from each other, so as to produce the variable delay-line time.

It would be possible to directly combine the receiver-wave and the transmitter-reference wave, in a mixer or converter, and obtain, from the mixture, the difference between the two frequencies, which would be the Doppler frequency $d$, due to the line-of-sight target-velocity, plus certain range-effects which will be discussed later on. This Doppler frequency could be measured, and it would show the radial or line-of-sight velocity of the target, but it would not show whether the target were advancing or receding. I therefore introduce a certain intermediate frequency into one of the incoming lines, either the received-signal line 25 or 32 (FIGS. 1 or 2), or the transmitter-reference line 27 or 22 (FIGS. 1 or 2). This intermediate frequency can be utilized as a Doppler-reference frequency, so that the frequency which is obtainable by mixing the two waves would be this intermediate Doppler-reference frequency plus or minus the Doppler frequency, thereby providing a means for ascertaining whether the target is approaching or receding, and thus providing a means whereby an automatic lock can be obtained on the target-velocity.

For the purpose of providing an intermediate Doppler-reference frequency, I provide a variable-frequency local-oscillator 35, which may have any suitable frequency higher than the highest expectable Doppler frequency. A very convenient frequency for this purpose is 456 kilocycles (kc.), as suitable apparatus for operation near this particular frequency is already in general use in other equipments. I prefer to use, for the local-oscillator 35, a variable-frequency oscillator in which the frequency is variable between the limits of $(456-D)$ kc., and $(456+D)$ kc., where D kc. is the highest expectable Doppler frequency.

The 456 kc. Doppler-reference frequency could be used directly for providing a Doppler-reference frequency, but it is sometimes desirable to provide an even higher intermediate frequency for Doppler-reference purposes, so that the intermediate-frequency equipment can be tuned for this intermediate frequency, with a proper band-width, as will be subsequently described. For this purpose, in the particular apparatus which I have chosen for illustration in my drawing, I have heterodyned the output of the variable-frequency 456 kc. local-oscillator 35, as obtained in the line 36, with the output of a $z$ mc. local oscillator 37, as obtained in the line 38, these two outputs being combined in a mixer or converter 39, having an output-line 41 which feeds an amplifier or filter 42 which is tuned to pass the sum of the two frequencies, or $(z+0.456)$ mc., delivering this frequency, through a line 43, to a mixer or converter 44.

The other input-side of the mixer or converter 44 may be fed either from the receiver-line 25 or 32, or from the transmitter-reference line 22 or 27, so that a variable intermediate Doppler-reference frequency, having a mean value of $(z+0.456)$ mc., is injected into either the receiver-wave or the transmitter-reference wave, as the case may be. In FIG. 1, it is injected into the transmitter-reference wave, while in FIG. 2 it is injected into the receiver-wave.

Turning first to FIG. 1, it will be noted that the mixer or converter 44 has its two input-circuits supplied from the lines 27 and 43 respectively, so as to mix the time-delayed transmitter-reference wave with the Doppler-reference wave, the mixture of these two waves being furnished by the output-line 45 of the mixer or converter 44. The difference between the $y$ mc. transmitter-reference wave and the $(z+0.456)$ mc. Doppler-reference wave is sorted out of the line 45, and passed by an amplifier or filter 46, which delivers the variable-frequency, $(y-z-0.456)$ mc., wave to the output-line 47 of the amplifier 46. This constitutes a new transmitter-reference wave, with the Doppler-reference frequency injected into it.

The transmitter-reference wave, of the line 47, is then mixed with the receiver-wave, of the line 25, in a mixer or converter 48, which supplies the mixture of the two waves through an output-line 49, which is connected to an amplifier or filter 51 which selects the difference between the two input-waves of the mixer or converter 48, passing a wave of the frequency $(z+0.456)$ mc. to the output-line 52 of the filter 51.

It is convenient, at this point, to heterodyne the wave of the line 52 with the $z$ mc. local-oscillator 37, as I have done, in the apparatus shown in FIG. 1, by supplying the $z$ mc. wave of the local-oscillator 37 through the input-line 53 of a mixer or converter 54. The other input-line of this mixer or converter is the line 52. The output-line 55 of the mixer or converter 54 is connected to a 456 kc. amplifier 56 having an output-line 57.

The line 57 is connected, through a limiter 58, followed by a band-filter 59, to supply a limited-amplitude wave to a discriminator 61. A discriminator is any means which has a mean-frequency response, of say 456 kc., and which produces, in its output-circuit 62, a voltage which is positive or negative, according to the input-frequency, into the discriminator, is above or below the predetermined frequency, of say 456 kc., the magnitude of the output-voltage being more or less linearly responsive to the frequency-variation.

The output-line 62 of the discriminator 61 is utilized for two purposes. A branch 62V is utilized for velocity-locking purposes, while a second branch 62R is utilized for range-locking purposes.

In FIG. 1, the velocity-locking branch, 62V of the discriminator-output is fed first through a direct-current integrator, or low-pass filter, 63, which passes only the extremely low frequencies, so that it will supply a current, through its output-circuit 64, only when the system is very close to being accurately locked or in tune to the line-of-sight target-velocity, as will be subsequently explained. The line 64 supplies a controlling voltage to a velocity-locking voltage-responsive automatic-frequency-control (AFC) apparatus, which is indicated by a block 65, this apparatus being provided with storage-facilities for enabling it to hold onto the line-of-sight velocity of a target during momentary interruptions in the received power. The output of the storage velocity-control device 65 is supplied, through a line 66, to a velocity-searching voltage-responsive variable-reactance control-device 67, which feeds directly, through a line 68, into the variable-frequency 456 kc. local-oscillator 35, to control the tuning, and hence the frequency, of the velocity-searching oscillator 35 in a manner which will be subsequently described. The AFC apparatus 65 responds to any departure from zero, in the input-voltage in its control-circuit 64, by thereupon either increasing or decreasing the tuned frequency of the reactance-control device 67, and hence the velocity-searching oscillator 35, according to the polarity of said input-voltage.

The other, or range-locking, branch 62R of the discriminator-output is fed to one of the input-sides of a demodulator or phase-comparator, which is shown by a block 70. The other input-side of the phase-comparator 70 is fed from the control-line 9 of the transmitter 7, by means of a branch-circuit 71, so that the phase of the sinusoidal modulator-wave, as supplied by the modulator 8, may be compared to the phase of any residual modulator-frequency wave which exists in the discriminator-output circuit 62R, by reason of the fact that the relative magnitudes of the modulating-frequency period of the modulator 8, and the delay-line time of the delay-line 26, are not properly correlated with the range-delay, or time necessary for the radar-signal to go out to, and return from, the target. Since the output of the discriminator 61 is phase-shifted 90° with respect to the transmitter-modulation, a second 90° phase-shifter 72 is interposed, in either one of the two input-circuits 71 or 62R of the phase-comparator 70, so as to balance out that phase-shift. In the particular embodiment of my invention which is illustrated in the drawings, the 90° phase shifter 72 is interposed in series with the line 71.

In order to match the time-delay which is introduced by the delay-line 26 in the reference-wave which is obtained in conductors 45 and 47, and which is thus continued through into the input-conductor 62R of the phase-comparator 70, a similar time-delay is introduced in the other input-conductor 71 of this phase-comparator 70, as by means of an audio-frequency delay-line 72', connected in series with the conductor 71, as shown in FIG. 1. This audio-frequency delay-line 72' may be designed as described in "Electric Oscillations and Electric Waves," by George W. Pierce, 1st ed., 1920, pages 298–313.

The output of the phase-comparator 70 is a direct-current voltage, which varies, in magnitude and direction, in response to the magnitude and direction of the phase-departure of the two modulator-frequency input-waves of the phase-comparator. This output-voltage of the phase-comparator is supplied, through a line 73, to an amplifier 74 having storage-facilities for enabling the apparatus to maintain its range-lock on a target in spite of momentary interruptions of the received energy. The output of the amplifier 74 is supplied, through a line 75, to a range-searching voltage-responsive automatic-frequency-control (AFC) device 76, the output of which is supplied, through a line 77, to a range-searching voltage-responsive variable-reactance control-device 78. The AFC apparatus 76 responds to any departure from zero, in the input-voltage in its control-circuit 75, by thereupon changing the tuning of the reactance-control device 78 in one direction or the other, according to the polarity of said input-voltage.

The range reactance-control device 78 is connected, through a line 80, to a variable-frequency range-selecting oscillator 81 to control the tuning, and hence the frequency, thereof. The object of the range-searching control-apparatus is to control the frequency of the sine-wave modulator 8. As will be subsequently described, the modulator-frequency of the modulator 8 varies between 12.7 kc. and 23.3 kc., in the particular apparatus which I have chosen for illustration in FIG. 1. It is more convenient, however, to have the range reactance-control device 78 control a variable-frequency range-fixing oscillator 81 of a considerably higher frequency. As a matter of convenience, although my invention is not limited thereto, I have chosen a variable-frequency range-oscillator 81 having a frequency-range between 212.7 kc. and 223.3 kc.

The output of this range-oscillator 81 is supplied, through a line 82, to one of the input-sides of a mixer or converter 83, the other input-side of which is energised from a line 84 which is supplied by a fixed-frequency 200 kc. oscillator 85. The mixture of the frequencies of the two range-controlling oscillators 81 and 85 is supplied, by the mixer or converter 83, through a line 86 which is connected to a low-pass filter 87, which passes only the difference between the two input-frequencies of the mixer or converter 83. Thus, the filter 87 may have a band-pass width of from 6 to 30 kc., which will pass the variable range-frequency of from 12.7 to 23.3 kc., with a comfortable margin on either side. The output of the filter 87 is connected, through a line 88, to control the frequency of the sine-wave modulator 8.

If the range of frequencies due to the Doppler effect is similar to the range of frequencies of the sine-wave modulator 8, it is frequently desirable to cause the radar-equipment to first lock itself in, with respect to the velocity of the target, before attempting a lock on the range of the target. Such an apparatus is illustrated in FIG. 1, but before its operation can be described, it is necessary to understand a number of automatic-control connections, which will now be described, after which the operation will be discussed.

From the line 57 which carries the amplified wave resulting from a combination of the receiver-wave and the transmitter-reference wave, an auxiliary branch-connection 90 is made, leading to a 456 kc. detector 91, which has two output-circuits 92 and 93.

The detector-circuit 92 has four branches. A branch 92S impulses or activates a search-selector 94 which will be subsequently described. A branch 92V controls an automatic volume-control (AVC) apparatus 95 which controls the receiver-line amplifier 24. A branch 92T may be used for providing "On Target" information. A branch 92L controls the lobing-frequency amplifier 5, which has two output-circuits 96 and 97, which are used, respectively, to energize the control-input circuits 98 and 99 of the elevation-control equipment 4 and the azimuth-control equipment 3, respectively, these connections being made through two make-contacts 101 and 102 of a relay R3.

The detector-circuit 93 is connected to an integrator 103, which rejects momentary impulses, and responds to sustained impulses, to energize an output-circuit 104 only when the detector 91 remains in the detecting condition for a predeterminedly long moment of time. The output-circuit 104 of the integrator 103 energizes the operating-coil of a relay R2, which has a make-contact 107, a back-contact 108, and a make-contact 109.

The first relay-contact 107 of the relay R2 is utilized to energize an operating-circuit 111, for energizing the operating-coil of a relay R1, said relay R1 having a back-contact 112, which normally grounds a blocking control-circuit 113 of the velocity-searching reactance-control apparatus 67, so as to hold said control-apparatus inoperative, or at its normal minimum-frequency adjustment, whenever its control-circuit 113 is grounded.

The second relay-contact 108 of the relay R2 is utilized to interrupt an auxiliary control-circuit 114 of the range-finding AFC device 76, so as to remove said control-circuit 114 from the control of a range-oscillator sweep-device 115. The sweep-device 115, in its operative condition, puts out a small biasing-voltage which causes the reactance-control device 78 to continually reduce its frequency as long as this biasing-voltage is not counteracted by an equal and opposite control-voltage in the control-circuit 75.

The third relay-contact 109 of the relay R2 is utilized to energize a control-circuit 116 which energizes the operating-coil of the relay R3. This relay R3, in addition to the two make-contacts 101 and 102, which have already been described, is provided with two back-contacts 117 and 118, which are respectively used to connect the elevation-controlling generator 4G and the azimuth controlling generator 3G to the control-circuits 98 and 99, respectively.

The search-selector 94 is a two-position apparatus, that is, an apparatus which remains in whichever position it is moved to. In its operative position, this search-selector 94 supplies a controlling voltage to its three output-circuits 121, 122 and 123. Said search-selector 94 has two input or control-circuits 124 and 92S, the input-circuit 124 being a deenergizing or opening circuit for moving the search-selector to its open or inoperative position, while the input-circuit 92S is a closing or energizing circuit which moves the search-selector to its closed or operative position. The various functions of these several circuits, and the operational procedure of the search-selector 94 itself, will be subsequently described more in detail. At present, it will only be noted that the first output-circuit 121 of the search-selector 94 exercises a starting-control over the range-oscillator sweep-device 115, and the second output-circuit 122 of the search-selector 94 exercises a blocking control over a velocity-oscillator sweep-control device 125, which has an output-circuit 126 for applying a small biasing-voltage to the velocity-searching AFC device 65 to cause this AFC device 65 to continually increase its frequency as long as said biasing-voltage is not counteracted by an equal and opposite control-voltage in the control-circuit 64; while the third output-circuit 123 of the search-selector 94 exercises a stepping-up or indexing-control over the velocity-searching reactance-control device 67.

The selector-opening input or control-circuit 124 of the search-selector 94 is controlled from a piece of equipment which is designated as a detector and cathode-follower device, as indicated by a block 127, which is in turn controlled by the output-circuit 128 of a 223.3 kc. filter 129, which is controlled by a branch-circuit 130 leading from the conductor 82.

In addition to the selector-opening output-circuit 124 of the detector and the cathode-follower 127, this apparatus has two other output-circuits, namely, an output-circuit 131 which exercises a blocking-control over the range-oscillator sweep-device 115, and an output-circuit 132 which exercises a blocking-control over the sine-wave modulator 8.

The range-searching reactance-control device 78 has also an output-circuit 133 which exercises a reversing-control over the range-oscillator sweep-device 115.

The velocity-searching reactance-control device 67 is also provided with a re-cycling device 134, which has an input-circuit 135, energized from the velocity-searching reactance-control device 67, and an output-circuit 136 which exercises a recycling-control over the velocity-searching reactance-control device 67, as will be subsequently described.

Two measuring-devices are provided, namely, a range-measuring device 137, which is controlled from a branch-circuit 138 leading from the conductor 88; and a velocity-measuring device 139, which is controlled from a branch-circuit 140 leading from the conductor 36. These two measuring-devices measure the range and the line-of-sight velocity of the the target, as will be subsequently described. They are connected, respectively, to circuits 141 and 142 which give "Range" information and "Velocity" information, respectively. In addition, the velocity-measuring device 139 is provided with an output-circuit 143 which is utilized to exercise a control over the range-following AFC device 76.

After a prospective target has been found by the manually controlled aim of the antenna-system 1—2, by suitable control of the azimuth and elevational generators 3G and 4G, the automatic target-following equipment can be set in operation by depressing a push-button 144, which is located near the integrator 103 in FIG. 1, and which is marked "Search," to indicate that the equipment is being asked to search for the target. This searching push-button 144 serves to initially energize the control-circuit 111 which picks up the relay R1.

When it is desired to have the apparatus cease tracking a target on which it has fastened, the operator is provided with a "Reject" push-button 145, which grounds the operating-coil of the relay R1, thus causing the automatic target-tracking apparatus to lose its target, releasing the automatic tracking of that target.

In the operation of the particular apparatus which is shown in 144 FIG. 1, before the "Search" button is depressed, that is, when the apparatus is not automatically locking itself on a target, the range-searching apparatus 115 will be in its maximum range, or maximum-frequency, position, being biased so that it will drift to that position, when left undisturbed, making the range-finding oscillator 81 and the sine-wave modulator 8 assume their maximum frequencies. At the same time, the velocity-searching apparatus 125 will be in its minimum-frequency position, for responding to a target which is approaching at the maximum velocity, said velocity-searching apparatus being biased so as to automatically move into that condition, when it is left undisturbed, making the velocity-finding oscillator 35 assume its minimum frequency, $(456-D)$ kc.

The maximum range of the apparatus shown in FIG. 1 is obtained when the range-finding frequency of the oscillator 81, and the modulating-frequency of the modulator 8, both have their highest values, as will be subsequently explained. In the particular apparatus which is illustrated in FIG. 1, the maximum-range oscillator-frequency, of the oscillator 81, is 223.3 kc. The filter 129 responds to this maximum frequency of 223.3 kc., and passes a strong signal, at this frequency, through the connection 128 to the detector and cathode-follower 127, causing the latter to produce a maximum direct-current output-voltage in each of its three output-circuits 124, 131 and 132. This high cathode-follower voltage, as transmitted through the circuit 131, blocks or stops the upward frequency-sweep or drift of the range-oscillator sweep device 115, through the circuit 124 it opens the search-selector 94 or restores it to its deenergized or unresponsive condition and holds it in said condition, and through the circuit 132 it blocks, or applies a cut-off bias to, the sine-wave modulator 8, preventing the frequency-modulation (FM) of the $x$ mc. transmitter-wave.

Normally, therefore, that is, before the "Search" button 144 is depressed, the sine-wave modulator 8 is cut off, and a continuous unmodulated wave is being transmitted by the transmitter 7. At the same time, the velocity-searching reactance-control device 67 has its grounded blocking-circuit 113 completed at the relay-contact 112, so that this velocity-searching control-device 67 will be caused to move to its minimum-frequency setting at which the velocity-searching oscillator 35 has its minimum frequency, which is $(456-D)$ kc., corresponding to a target which is approaching the observer at the maximum line-of-sight velocity to which the apparatus can respond. At the same time, the blocking-circuit 122 of the velocity-searching sweep-circuit device 125 is unblocked because the search-selector 94 is opened by its control-circuit 124 which comes from the maximum-frequency-responsive detector and cathode-follower 127 of the range-searching equipment; and hence the velocity-searching sweep-device 125 stands ready to begin to make the reactance-control device 67 increase the frequency of the velocity-searching oscillator 35 as soon as the grounded blocking-circuit 113 is opened.

When, now, a target is manually found, the antenna-system 1—2 being manually aimed approximately at this target, the search-button 144 is depressed, and held depressed for a moment. Instantly the ground is removed, by the relay R1, from the normally grounded blocking-circuit 113 of the velocity-searching reactance-control device 67, thus permitting the velocity-oscillator sweep-circuit device 125 to begin to rapidly increase the frequency of the velocity-determining local oscillator 35.

Figure 3:
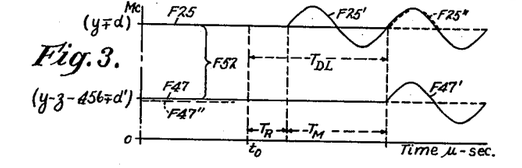
FIGS. 3 and 4 are wave-diagrams which will be referred to the explanation of the operation of the apparatus shown in FIGS. 1 and 2, respectively.

To understand the velocity-locking operation, whereby the apparatus searches for, and finds, the line-of-sight velocity of the target at which the antenna-system is aiming, and locks itself onto that particular velocity, it is desirable to refer to FIG. 3, in which the straight-line curve F47 represents the frequency of the unmodulated transmitter-reference-wave, as it appears in the conductor 47 of FIG. 1, after having been heterodyned down to an intermediate frequency $(y-z)$ mc., and again heterodyned with the velocity-reference frequency $(0.456\pm d')$ mc. of the local oscillator 35. This frequency is a frequency $(y-z-0.456\mp d')$ mc., which remains constant with time, the time being plotted in microseconds in FIG. 3.

FIG. 3 also shows another straight-line curve F25, which shows the frequency of the received echo-wave, as it appears in the conductor 25 of FIG. 1, after it has been heterodyned down to a frequency of $y$ mc. This received echo-wave has its frequency shifted by the Doppler frequency of $d$ mc., so that its frequency becomes $(y\mp d)$ mc., which remains constant with time, as shown in FIG. 3.

Since the sine-wave modulator 8 is shut off, both of these frequencies, F47 and F25, in FIG. 3, are unmodulated in frequency, showing as straight lines in FIG. 3, which plots frequency against time. There is, therefore, a constant difference between these two frequencies, F47 and F25, in FIG. 3, this difference being a frequency of $(z+0.456\pm d'\mp d)$ mc. This is the frequency which exists in the conductor 52 in FIG. 1, and it is indicated as F52 in FIG. 3.

In FIG. 1, this F52 frequency is heterodyned, as a matter of convenience, with the $z$ mc. local-oscillator frequency, to produce the frequency $(0.456\pm d'\mp d)$ mc., which is the frequency of the conductor 55 in FIG. 1. This frequency differs from its mean frequency of 0.456 mc. by only small frequency-variations $(\pm d'\mp d)$ mc., and it is a function of the discriminator 61 to pick out this frequency-variation, and respond to it, producing an output-voltage, in the circuit 62, which varies in sign and magnitude, in accordance with the variation from the mean frequency.

The branch-circuit 62V of the discriminator 61, in FIG. 1, supplies these frequency-variation control-voltages to the automatic velocity-searching apparatus, which consists of the AFC device 65, the variable-reactance device 67, and the frequency-changing sweep-circuit device 125.

Going back, therefore, to the instant when the "Search" button 144 was depressed, in FIG. 1, the relay R1 immediately opens the blocking ground-circuit 113 of the velocity-searching reactance-control apparatus 67 as previously described, thus permitting the frequency-changing sweep-device 125 to immediately begin its function of rapidly increasing the frequency of the 456 kc. local oscillator 35, that is, increasing the increment $d'$ so as to change it toward a higher positive value, thus looking for the velocity of a target having a smaller and smaller line-of-sight component, approaching the observer. When the value of this increment $d'$ coincides, in magnitude and direction, with the Doppler frequency $d$, the quickly acting electronic discriminator 61 instantly responds to this condition by putting out an approximately zero output-voltage, which is instantly responded to by the quick-acting electronic AFC device 65, causing the latter to automatically lock the frequency of the variable-frequency 456 kc. local oscillator 35 at this value, thus automatically holding the variable-frequency increment $d'$ at approximately the value $d'=d$. The variation of the local-oscillator frequency-increment $d'$, during the search for a frequency corresponding to the Doppler effect, is indicated by the dotted line F47" in FIG. 3.

If the frequency-searching device 125 should sweep the velocity-searching variable-frequency 456 kc. local oscillator 35 through its mean frequency of 456 kc., corresponding to a zero target-velocity, before the velocity-searching AFC device 65 finds the velocity of the target, then a velocity-indication will be obtained, whether there is a zero-velocity target or not, because there is enough leak-through from the transmitter to give this indication. This zero-velocity target-lock will be held, while the range-searching apparatus, as will be subsequently described, searches through its entire response-limit for a target-range of a zero-velocity target, which will rarely be found, because targets do not, in general, have a zero line-of-sight velocity with respect to the observer. As will be subsequently described, the range-searching apparatus, if it fails to find a responsive range, deenergizes the search-selector 94 and causes the output-circuit 123 of the latter to index, or step up, the frequency of the 456 kc. oscillator 35, giving the latter a frequency-increment which is sufficiently large to avoid the spurious zero-velocity lock, thus permitting the velocity-searching sweep-device 125 to continue to increase the frequency of the 456 kc. oscillator 35 to frequencies lying in the range between 456 kc. and (456+D) kc., looking for the frequency of a possible receding target.

In case the velocity-searching sweep-device 125 should increase the Doppler-reference oscillator-frequency to its maximum value of (456+D) kc., before a target is found, the re-cycling device 134 responds to this maximum frequency and automatically changes the connections of the variable-reactance device 67 so that the frequency of the Doppler-reference oscillator 35 is automatically and instantaneously changed from its maximum to its minimum value, that is from (456+D) to (456−D) kc., and the frequency-increasing sweep-circuit 125 keeps right on increasing the frequency from this lowest value of (456−D) kc., until the target-frequency is found.

When the automatic velocity-seeking frequency-control device 65 of FIG. 1 finds, and holds onto, a target-velocity, either real or apparent, while the transmitted radar-wave is still an unmodulated continuous wave, the detector 91 responds to the 456 kc. wave in the circuit 57, and energizes its output-circuit 92, including the branch-circuit 92S. The branch-circuit 92S instantly energizes the search-selector 94. The output-circuit 122 of the search-selector 94 thereupon blocks or stops the frequency-changing sweeping or searching of the velocity-oscillator sweep-device 125, thereby relieving the control-circuit 64 of the duty of fighting against, or overcoming, the drift-producing biasing-voltage of the sweep-device 125, and thus causing said control-circuit 64 to hold the Doppler-matching frequency of the oscillator 35 more accurately on target. At the same time, the output-circuit 121 of the search-selector 94 starts the range-oscillator sweep-device 115 searching down, in frequency, reducing the frequency of the range-oscillator 81 from its maximum value of 223.3 kc., this starting-action of the circuit 121 being strong enough to overcome the holding action of the circuit 131 which is also acting on the sweep-device 115. This range-oscillator sweep-device 115 controls the automatic range-finding frequency-controller 76 through the circuit-connection 114 and the back-contact 108 of the relay R2.

As soon as the range-oscillator frequency begins to fall below its maximum value of 223.3 kc., as determined by the 223.3 kc. filter 129, the cathode-follower 127 reduces its output-voltage in its three output-circuits 124, 131 and 132. An immediate effect of this reduction in the voltage of the output-circuit 124 of the cathode-follower 127 is to permit the search-selector 94 to remain in its responded condition, so that said search-selector 94 will not become deenergized when the detector 91 and the selector-operating detector-circuit 92S become deenergized during the subsequent brief range-finding operation, as will be hereinafter described. At the same time, the reduction in the voltage of the output-circuit 131 of the cathode-follower 127 removes the blocking-action from the range-oscillator sweep-device 115, although this does not produce any immediate effect, because the search-selector circuit 121 has already started said sweep-device 115, even before the blocking-circuit 131 was partially deenergized. Another immediate effect of the reduction in the output-voltage of the cathode-follower 127 is in the circuit 132, the reduced energization of which immediately removes a cut-off bias from the sine-wave modulator 8, and permits the latter to pass the modulation-frequency which is obtained from the mixer 83, after heterodyning the frequency of the variable-frequency range-oscillator 81 with the 200 kc. output of the range-oscillator 85. At this instant, the sine-wave modulator 8 commences to frequency-modulate the transmitted radar-wave which is put out by the transmitter 7.

The range-finding operation of the apparatus of FIG. 1 will be best understood by reference to FIG. 3. Let us assume that, at the moment $t_0$ in FIG. 3, the modulator 8 starts modulating the transmitted radar-wave at a modulation-frequency which is correct for the range of the target. The echo-wave F25 will be retarded by the range-delay $T_R$ in FIG. 3, this range-delay being the time (in microseconds) required for the transmitted wave to travel to the target and back from the target, at the velocity of light. Mathematically, the range-delay $T_R$, in microseconds, is equal to the one-way distance or range in centimeters, divided by 15,000. From this time on, that is, after the expiration of the range-delay $T_R$ in FIG. 3, the echo-wave F25 is frequency-modulated, as shown by the sinusoidal portion of the curve F25, as indicated at F25', in FIG. 3. The modulating-period is indicated at $T_M$ in FIG. 3, this being the time required for one cycle of the modulation-frequency.

When we consider the case of the transmitter reference wave F47 of FIG. 3, it will be noted, from FIG. 1, that an artificial delay-line 26 is interposed between the transmitter 7 and the transmitter-reference circuit 47. The delay-line time is indicated at $T_{DL}$, in FIG. 3. At the expiration of this time, measured after the instant $t_0$ when the transmitted wave first began to be frequency-modulated at the correct modulation-frequency having the modulation-period $T_M$ in FIG. 3, the transmitter-reference wave F47, which is fed back to the automatic apparatus through the circuit 47 in FIG. 1, begins to be frequency-modulated, as indicated by the sinusoidal portion F47' of the transmitter-reference wave 47 in FIG. 3.

If the relative values of the delay-line time $T_{DL}$, the range-delay $T_R$, and the modulation-period $T_M$ are all correctly related to each other, the delay-line time $T_{DL}$ will be exactly equal to the sum of the range-delay $T_R$ and the modulation-period $T_M$, as shown in FIG. 3. Mathematically expressed, this relationship is as follows:

$$T_R = T_{DL} - T_M \quad (2)$$

When this relationship holds, the sinusoidal portion F25' of the echo-wave will be exactly in phase with the sinusoidal portion F47' of the transmitter-reference wave, so that the frequency-difference, F52, between the two waves, will always remain constant at a fixed value; and since the system is velocity-locked on the target, so that the Doppler frequency $d$ is exactly counterbalanced by the frequency-deviation $d'$ of the velocity-reference oscillator 35, this frequency-difference, F52, will be precisely $(z+0.456)$ mc., in the circuit 52, or 456 kc. in the circuit 55 in FIG. 1. Consequently, there will be no frequency-deviation, from the mean value of 456 kc., to be responded to by the discriminator 61, and hence the output-voltage of the discriminator will be zero, in the range-finding branch output-circuit 62R.

If, however, there should be ever so slight a phase-difference between the two sinusoidal wave-portions F25' and F47' in FIG. 3, as indicated in dotted lines at F25", the output of the discriminator 61 will include a sinusoidal component at the modulating-frequency of the sine-wave modulator 8, and this modulation-frequency component will be compared, in the phase-comparing modulator or phase-comparator 70, with the phase of the sine-wave modulator 8, time-delayed to match the reference-wave F47', to determine whether the phase-shift of the dotted line F25″ is forward or backward, thus determining in which way a correction is required in order to maintain the conditions of Equation 2.

The reason for the delay-line 26 can be understood from the following considerations. If this delay-line were not present, that is, if $T_{DL}=0$, the in-phase condition of the two sinusoidal wave-portions F25′ and F47′ would be obtained, not only when the modulation-period $T_M$ was exactly equal to the range-delay $T_R$, but also when the modulation-period $T_M$ was exactly equal to $2T_R$, $3T_R$ or any other integral multiple of the range-delay $T_R$. In other words, it would be impossible to ascertain the value of the range-delay period, and hence it would be impossible to ascertain the range of the target. Not only would there be many possible ranges, for each modulation-frequency, but there would be many modulation-frequencies for any given range. Without the delay-line 26, therefore, it would be quite impossible to determine or measure the range of the target.

A significant thing about the determination of the range, is that the range to be measured will vary over extremely wide limits, involving, for example, a ratio of 37:1, more or less, between the maximum and minimum ranges to which the equipment must respond; whereas, if the equipment is to have only one response-condition for each range, and only one range for each response-condition, the variable factor, which measures range in the equipment, must not vary over a ratio of as much as 2:1, as otherwise there would be two or more settings of the equipment-adjusted, which would correspond to any given range, or two or more range-multiples which would correspond to any equipment-setting.

If, for example, a range-delay of one microsecond is taken as the minimum range to which the equipment will respond (although I am not limited to this particular figure), and if the maximum range-delay which is measurable by the equipment is R microseconds, and if this maximum range-delay corresponds to a range which is longer than the operative range of the equipment, so that the equipment could not detect echo-waves from a target far enough away to have a range-delay of R microseconds, then if we can determine what range-delay time we have, between the limits of one and R microseconds, for any given target, we can know, for a certainty, that the range cannot be twice that value or three times, or any other integral multiple thereof, because we will have accurately canvassed the field of possible ranges, out beyond the limit of sensitivity of the apparatus.

Figure 4:
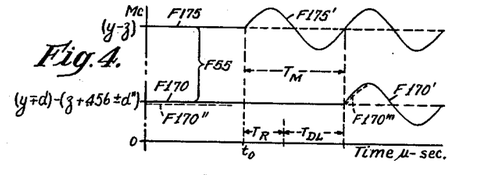

As previously intimated, the delay-line can be inserted, either in the transmitter-reference line, as shown at 26 in FIG. 1, or in the echo-wave line, as shown at 28 in FIG. 2. In the latter case, the frequency-deviation diagram will be as shown in FIG. 4, which will subsequently be described in more detail. Suffice it to say, for the present, that the Time-Equation 2 will become $$T_R = T_M - T_{DL} \quad (3)$$

As previously intimated, also, the automatic control can be effected, either by varying the modulating frequency (or the modulation period), or by varying the delay-line time.

In Equation 2, if we express this equation in microseconds, and replace the range-delay $T_R$ by (1 to R) microseconds, and if we specify that either the delay-line time $T_{DL}$ or the modulation time-period $T_M$ is constant, while the other one varies between maximum and minimum values which are so related that the maximum value is less than twice the minimum value of the variable quantity, the conditions for successful operation will be obtained.

For example, if the delay-line time $T_{DL}$ is constant, then the modulation-period $T_M$, or the velocity of light divided by the modulating-frequency of the modulator 8, will vary between the limits of $(T_{DL}-1)$ and $(T_{DL}-R)$, while the range varies between the limits from 1 to R.

If the maximum value of the modulation-period $T_M$ is less than twice its minimum value, in Equation 2, then $$T_{DL}-1 < 2(T_{DL}-R) \quad (4)$$

$$T_{DL} > 2R-1 \quad (5)$$

If, on the other hand, in Equation 2, the modulation-frequency should be constant, which means that the modulation-period $T_M$ would be constant, then the delay-line time $T_{DL}$ would have to vary between the limits of $(T_M+1)$ and $(T_M+R)$, as the range-delay time varies between 1 and R microseconds. If, then the maximum value of the delay-line-time is to be less than twice its minimum value, then $$T_M + R < 2(T_M+1) \quad (6)$$

$$T_M > R-2 \quad (7)$$

In Equation 3, a similar analysis will show that if the modulation-period $T_M$ is the variable, the delay-line time $T_{DL}$ must be greater than $(R-2)$, whereas, if the delay-line time $T_{DL}$ is the variable, the modulation-period $T_M$ must be greater than $(2R-1)$.

The foregoing analysis will show that, if a constant delay-line is to be utilized, it will have to have a value greater than $(R-2)$, if the delay-line is placed in the echo-wave line, as shown in FIG. 2; and it will have to have a considerably larger value, of at least $(2R-1)$, if said delay-line is placed in the transmitter-reference line, as shown in FIG. 1. If, however, the length of the delay-line is not a compelling consideration, then it may be desirable to place the delay-line in the transmitter-reference line, as is done in FIG. 1, because a practically unlimited amount of power is readily available in this line, for driving current through the delay-line, whereas the echo-wave line has such an infinitesimal amount of available power that, under the best conditions, it requires amplification almost up to the highest tolerable limit wherein the noise will begin to make the amplified signal indistinguishable. On the other hand, if the delay-line is to be varied, while the modulation-frequency is held constant, then the maximum value of the delay-line time will be more nearly equal, whether the delay-line is placed in the transmission-reference line or in the echo-wave line.

In the illustrative example of my invention shown in FIG. 1, I have chosen an adequate factor of safety, making the maximum range-delay R equal to 37 microseconds, corresponding to a range of some 6073 yards, for an equipment which has a maximum sensitivity-range of 6000 yards. In FIG. 1, I have shown a constant delay-line time of 80 microseconds, which means, according to Equation 2, that the modulation-period will have to vary between 43 and 79 microseconds, while the range-delay varies between 37 and 1 microseconds. This means that the modulating frequency will vary between approximately 23.3 kc. and 12.7 kc., a range less than 2:1.

It is possible to generalize Equations 2 and 3 into a single equation which states that the range-time is $$T_R = x - y \quad (8)$$

where the design-constant $x$ represents either the delay-line time $T_{DL}$ or the modulation-period $T_M$, according as the delay-line is inserted in the transmission-reference line 20 as shown at 26 in FIG. 1, or according as the delay-line is inserted in the echo-wave line 14 as shown at 28 in FIG. 2, respectively, while the other design-constant $y$ represents $T_M$ or $T_{DL}$, respectively. Then, if one of the design-constants, either $x$ or $y$, is non-variable, while the other design-constant, $y$ or $x$, as the case may be, is variable between such limits that its maximum value is less than 2 times its minimum value, and if the range-time $T_R$ is variable between such limits that the maximum value $T_{Rmax}$ is $r$ times the minimum value $T_{Rmin}$, $r$ being much larger than 2, it follows, from such inequalities as (4) to (7), that the non-variable design-constant, $x$ or $y$, as the case may be, must satisfy either the inequalities, $$(x - T_{Rmin} = y_{max}) < 2(x - rT_{Rmin} = y_{min})$$

whence $$x > (2r-1)T_{Rmin} \quad (9a)$$

or the inequalities, $$(y + rT_{Rmin} = x_{max}) < 2(y + T_{Rmin} = x_{min})$$

whence $$y > (r-2)T_{Rmin} \quad (9b)$$

as the case may be. When these design-relationships are observed, the modulating-frequency (which is proportional to the reciprocal of the modulation-period $T_M$) and the delay-means delay $T_{DL}$ are so related that only one of them needs to be varied, over a range less than 2-to-1, while searching for a target-range (represented by the range-time $T_R$) which may vary over a much greater range than 2-to-1.

Adverting back to the description of the automatic control-apparatus, we left the automatic range-finding frequency-controller 76 searching downward, through the various frequencies of the variable-frequency range-oscillator 81, until it found the proper range-oscillator frequency, which matched with the delay-line time $T_{DL}$ and the range-time $T_R$ of the wave going out to the target and returning back from the target. Before this correct range-frequency was found, however, in the very brief time while the range-finding device was searching downward, in frequency, hunting for it, the sinusoidal waves F25' and F47' of FIG. 3 were not in phase with each other, and hence their frequency-difference F52 was not a constant value, but was modulated according to the momentary frequency of the sine-wave modulator 8. The result of this disturbance of the current, in the circuits 52, 55 and 57 of FIG. 1, is to cause the detector 91 to drop out, until the proper range-finding frequency is found, notwithstanding the fact that the velocity-finding frequency, of the 456 kc. local-oscillator 35, remains fixed in correspondence with the Doppler frequency due to the radial velocity of the target.

In the brief time before the proper ranging-frequency was found, however, the modulation-frequency variations in the discriminator-input wave had meanwhile been responded to by the discriminator 61, to produce a modulator-frequency wave, in the branch output-circuit 62R, which was rejected by the phase-comparator 70, because it was not in phase with the sine-wave-modulator 8 (after correcting for the 90° phase-displacement which was present in the discriminator 61). These modulation-frequency variations in the discriminator-output were kept out of the velocity-finding frequency-controller 65 by the low-pass filter 63, which permits the passage of only the very low-frequency variations in direct-current voltage, which are necessary to control this device.

It is necessary, of course, for the bandwidth of the 456 kc. amplifier 56 to be sufficiently wide to accommodate the modulator-frequency bands of the wave which exists in the circuits 55 and 57 while the ranging frequency-controller 76 is searching for the correct range-frequency. Either this whole modulation-frequency band-width, on each side of the mean frequency 456 kc., is provided for, or at least a sufficient portion thereof to obtain the described operation of the phase-comparator 70.

When the ranging frequency-controller 76 finds the proper range-frequency, the sinusoidal wave-portions F25' and F47' come into phase-coincidence, and the modulator-frequency modulation disappears in the current flowing through the circuits 55 and 57. Consequently, the discriminator-output again becomes zero, and the ranging-frequency controller 76 locks onto the range-oscillator frequency which has been found. At the same time, the detector 91 again picks up, and produces an output-voltage in its two output-circuits 92 and 93.

It will be recalled that the cathode-follower 127 held the search-selector 94 in its responded condition, or permitted it to remain in said condition, during the time when the detector 91 became non-responsive while the ranging-controller 76 was searching for the proper range-frequency.

Meanwhile, however, the detector 91, through its output-circuit 93, has supplied two impulses to the integrator 103, once when the velocity-finder 65 found the velocity corresponding to the Doppler frequency, while the transmitted radar-wave was still unmodulated, and now after the range-finder 76 has found the proper modulation-frequency. The first impulse from the detector 91 to the integrator 103 was very brief, because the electronic search selector 94 and the electronic range-finding apparatus, such as 115, 76 and 127, were very fast, practically instantly causing the detector 91 to be deenergized, during the brief moment while the range-finding equipment was finding the proper ranging-frequency for the sine-wave modulator 8. When this proper modulator-frequency is found, however, the detector 91 becomes reenergized, and this time, it stays energized. The integrator 103 is designed so that it will reject the first momentary impulse, but will respond to the sustained energization of the detector 91. The response of the integrator 103 energizes the relay R2.

The first contact 107 of this relay R2 picks up and bypasses the "Search" push-button 114, thus providing a "holding" circuit for the operating-coil of the grounding relay R1, keeping this relay energized so that it removes the ground from the control-circuit 113 of the velocity-searching reactance-control device 67. While it has taken many words to describe the events which transpire between the first depression of the "Search" button 144, and the picking up of the automatic "holding" circuit at the relay-contact 107, these operations have been performed electronically, and really required but a moment of time.

The second contact of the relay R2 is a back-contact 108, which opens and disconnects the range oscillator sweep-device 115 from the ranging frequency-controller 76, which has already found its proper ranging-frequency, and needs no more sweeping or range-finding operation.

The relay R2 has a third contact, 109, which picks up and energizes the relay R3, transferring the antenna-control from the manually controlled azimuth and elevation-controlling generators 3G and 4G, to the lobing-frequency amplifier 5, which is controlled by the detector 91. The lobing-frequency amplifier 5 so regulates the azimuth and elevational controls 3 and 4 as to hold the antenna-system 1—2 on the target, in a manner well known in the art.

Information relative to the target is obtained by various means, in FIG. 1. The fact that the automatic control-apparatus is locked onto the target is given by the circuit 92T, which is shown as being energized from the detector 91. Information as to the line-of-sight velocity of the target, whether approaching or receding, is given by the circuit 142, which is energized from a velocity-measuring device 139 which is responsive to the frequency of the variable-frequency velocity-reference oscillator 35. Information concerning the range of the target is given by the circuit 141, which is responsive to the range-measuring device 137, which is in turn responsive to the modulating frequency. And finally, information relation to the elevation and azimuth of the target is obtained from the antenna-controlling devices 4 and 3, respectively.

In the proceding description of the finding of the proper range-frequency by the automatic frequency-controller 76, it has been assumed that this range-frequency was immediately found, while the range-oscillator sweep-device 115 was reducing the range-oscillator frequency from its maximum value of 223.3 kc. If, for any reason, the ranging-device 76 failed to find the proper ranging-frequency during this first downward sweep of the range-oscillator frequency, the range-reactance control-device 78 will respond, when the frequency reaches its lowest permissible level, and will cause its output-circuit 133 to reverse the polarity, or the direction of operation, of the sweep-device 115, so that the latter will begin searching upwardly, in frequency, from the lowest permissible range-oscillator frequency of 212.7 kc.

The value of this lowest permissible range-oscillator frequency is determined by the fact that the apparatus cannot respond to a target at a zero range, because zero-range information is always present, regardless of any target, because of the previously mentioned leak-through from the transmitter to the receiving apparatus of the radar-equipment. Moreover, there is no need to utilize a radar-equipment to detect a target which is at zero range. In the apparatus which I have described, it is assumed that a target-range corresponding to a range-delay of one microsecond will be the minimum range to which the equipment can be responsive. A one-microsecond range-delay corresponds to a range of 164.1 yards. I am not limited to any particular figure, however.

When the range-sweep device 115 starts searching upwardly, from the minimum 212.7 kc. frequency of the range-oscillator 81, the range-searching process continues. If, this time, the ranging-controller 76 finds, and responds to, the correct ranging-frequency, it will lock onto it, and the operation will be the same as if it had found this frequency during the downward sweep of the sweep-circuit 115.

If, however, the ranging apparatus should miss finding the target-range, or, what is more likely, if the velocity-finding device 65 had seized on a spurious zero-velocity indication which was obtained from the leak-through from the transmitter, so that there was really no target which could be found by the ranging-apparatus, then the range-sweeping device 115 would increase the range-oscillator frequency right up to its maximum value of 223.3 kc. (in the example chosen for illustration). When this happens, the 223.3 kc. filter 129 again energizes the detector and cathode-follower 127, so that it produces a maximum output-voltage in its three output-circuits 124, 131 and 132. The circuit 131 stops the range-oscillator sweep-device 115 and leaves it in its maximum-frequency, or maximum-range, position or condition. The circuit 132 blocks the sine-wave modulator 8, so that the transmitted wave is no longer frequency-modulated. The circuit 124 opens or deenergizes the search-selector 94.

When the search-selector 94 returns to its open or non-responsive condition after having been in its responsive condition, its output-circuit 123 indexes or steps up the frequency of the 456 kc. oscillator 35 by a frequency-increment which is sufficiently large to remove the velocity-searching frequency-control 65 from the influence of the leak-through current which comes directly from the transmitter to the receiver, at the receiver-antenna 2. At the same time, the output-circuit 122 of the open or non-responsive search-selector 94 removes its "hold" from the velocity-oscillator sweep-device 125 and permits the latter to continue its upward search of the local-oscillator frequency, to find the frequency-increment $d'$ corresponding to the Doppler-frequency $d$, as previously described. All of these described operations occur very quickly, requiring a great deal of time to describe them, but actually taking place in almost no time at all, because of the very extremely fast operation of the electronic equipment.

Once the automatic equipment has locked itself onto a target, it will follow that target, automatically retuning or adjusting itself to hold onto four variables of that target, namely, its line-of-sight velocity, its range, its azimuth, and its elevation. The equipment will not transfer its affiliations to any other interfering target, unless it should coincide with the original target, in all four of these variables, within the range of acceptance of the equipment. By the same token, the equipment cannot readily be dislodged from its target, by reason of either accidental or enemy interference, because the equipment has four variables to hold onto, and is provided with signal-storage facilities, so that it will momentarily hang onto, or retain, the latest information received, respecting any one of these four variables, in case it should momentarily lose contact with the target with respect to that one variable, so that, when the signal again comes on, the automatic equipment will be close enough to the target, with respect to that variable, to pick it up again, and hang onto it.

There is one control-feature which has not yet been mentioned, in describing the operation of the FIG. 1 equipment, and that is a special use of the velocity-measuring device 139, at the top of the figure. This equipment has an output-circuit 143 which is used to force-feed or bias the range-finding frequency-controller 76 in accordance with the direction and the magnitude of the line-of-sight velocity of the target. Thus, if the target is approaching, its range will be decreasing, and the velocity-measuring device 139 will pass on that information to the range-finding device 76, making it easier for the latter to maintain its lock or hold on the range of the target. In like manner, the necessary information or bias is given, if the target is receding, so that its range will be increasing, according to the line-of-sight velocity of the target.

The control of the frequency of the first local-oscillator 15 is effected, in the particular apparatus which is shown in FIG. 1, by tapping off, from the circuit 22, a branch-circuit 160, which supplies an automatic frequency-control device 161 which is tuned to the frequency $y$ mc. The automatic frequency-control device 161 has an output-circuit 162 which controls an automatic frequency-controller 163 for the local-oscillator 15, so as to stabilize the frequency of the local-oscillator 15.

My automatic equipment, as shown in FIG. 1, will hang onto a target, as long as that target remains within the response-limits of the equipment, in all four of the variables, namely, velocity, range, elevation and azimuth. If it should become desirable to make the equipment reject such a target, once it has fastened on to it, the "Reject" push-button 145 may be depressed, thereby short-circuiting the grounding-relay R1, causing it to ground the control-circuit 113 of the velocity-reactance control-device 67, causing the equipment to lose the target.

FIG. 2 is designed to illustrate some of the many variations which can be made, in carrying out my invention, without exactly following the circuits shown in FIG. 1. Specifically, three variations or alternatives are illustrated in FIG. 2. The first variation is that the delay-line 26 of FIG. 1 need not be in the line or circuit of the transmitter-reference wave, as shown in FIG. 1, but it may be in the line of the echo-wave, as shown at 28, in FIG. 2, as already described. The second variation is, that the range-delay $T_R$ is equal to the difference between the delay-line time $T_{DL}$ and the modulation-period $T_M$, and either one of these two differential variables, $T_{DL}$ or $T_M$, may be varied, while the other is held constant. The third variation, which is illustrated in FIG. 2, is that the Doppler-reference frequency, which is illustrated as a frequency varying around a mean value of 456 kc., may be injected into either the transmitter-reference wave or the echo-wave, before these two waves are combined in a mixer or converter or frequency-comparing demodulator.

The circuit of FIG. 2 has already been described down to the point where the transmitter-reference wave is amplified and fed into the conductor 22, and to the point where the receiver-wave is amplified, fed through the variable delay-line 28, again amplified, and fed into the circuit 32. In FIG. 2, it has also been described how the variable 456 kc. local-oscillator 35 supplies its Doppler-reference heterodyning frequency through the circuit 36 to the mixer 39, and how the $z$ mc. local-oscillator 37 also supplies its frequency to the mixer 39, the output of which is amplified at 42, and supplied to the mixer 44.

In FIG. 1, it will be recalled that the mixer 44 was utilized to mix the Doppler-reference wave with the transmitter-reference wave, so as to inject the Doppler-reference frequency into the transmitter-reference wave. In FIG. 2, however, the mixer 44 is used to mix the Doppler-reference wave, as obtained from the circuit 43, with the receiver or echo-wave, as obtained in the circuit 32. The result of this mixture is supplied, through a circuit 169, to an amplifier 46', which is tuned to the frequency $(y-z-0.456)$ mc. This amplifier 46' passes its selected frequency-band on, through a circuit 170, to a mixer 48', which corresponds functionally to the mixer 48 of FIG. 1, in that it combines the echo-wave with the transmitter-reference wave, to energize an output-circuit 55, which energizes a chain consisting of the 456 kc. amplifier 56, the limiter 58, the band-filter 59, the discriminator 61, and the discriminator-output circuit 62, as in FIG. 1, The transmitter-reference input into the mixer 48', in FIG. 2, is obtained indirectly from the circuit 22, which feeds into a mixer 171, the other input-circuit of which is an out-put circuit 172 of the $z$ mc. local-oscillator 37. The output of the mixer 171 is delivered to a circuit 173, in which it is amplified, through a $(y-z)$ mc. amplifier 174, which delivers a current of this frequency to a circuit 175 which becomes the second input-circuit of the mixer 48'.

In FIG. 2, the discriminator-output circuit 62 has the two branches 62V and 62R, precisely as in FIG. 1. The branch-circuit 62V, in FIG. 2, energizes the chain consisting of the low-pass filter 63, the automatic velocity-searching frequency-controller 65, the velocity-reactance controller 67, and the conductor 68 which controls the variable-frequency 456 kc. local-oscillator 35, precisely as in FIG. 1.

In FIG. 2, the branch-circuit 62R, from the discriminator 61, leads to the phase-comparator 70, the other input-circuit of which is energized from the circuits 9 and 71, precisely as in FIG. 1, except that the audio-frequency delay-line 72' is not needed in the circuit 71 in FIG. 2, because the delay-line 28 of FIG. 2, is in the echo-wave which appears in the conductors 169 and 170, instead of being in the reference-wave which appears in the circuits 173 and 175. In FIG. 2, however, the output of the phase-comparator 70 is fed, through a circuit 176, to an amplifier 177. The output of the amplifier 177 is supplied, through a circuit 178, to an automatic range-control apparatus 179, which is provided with storage-facilities. The range-controller 179 has an output-circuit 180 which controls a delay-line control-device 181, which is indicated as having four mechanical connections as follows.

A mechanical connection 182 leads from the delay-line controller 181 to the variable delay-line 28, to control the length, or time-delay, of this piece of apparatus.

A mechanical connection 183 leads from the delay-line controller 181 to the detector and cathode-follower 127', to produce the same effect, on this apparatus, as the circuit 128 in FIG. 1, namely, to respond to conditions corresponding to the maximum range.

A third mechanical connection 184 extends from the delay-line controller 181 to a range-sweep reverser 185, which has an output-circuit 133' which leads to the range-sweep device 115', and performs a function comparable to the conductor 133 in FIG. 1, namely to reverse the direction of sweeping or searching of the range-sweep device, so that it starts to search upward from the minimum range to the maximum range of the apparatus. The range-sweep reverser 185 responds to the minimum length of 43 microseconds, for the delay-time of the delay-line 28, and so controls the range-sweep device 115' as to cause it to quickly change the delay-line control 181 so that the delay-line 28 is lengthened to a length corresponding to a 79 microsecond delay.

It will be noted, therefore, that the phase-comparator 70 is used, in FIG. 2, to automatically regulate a delay-line control-device 181, instead of regulating the modulating-frequency, as in FIG. 1. In FIG. 2, as shown at the top of the figure, the modulating-frequency is illustrated as having a constant value of 12.5 kilocycles, which is supplied from a local-oscillator 186, through a conductor 187, to the sine-wave modulator 8.

In FIG. 2, the delay-line control 181 is provided with a fourth mechanical connection 188, which controls a range-measuring device 137'.

In FIG. 2, the frequency of the first heterodyning local-oscillator 15 may be automatically controlled, if desired, to take the Doppler-frequency increment $d$ out of the echo-wave circuit, as explained in connection with FIG. 1. To this end, the circuit 175, in FIG. 2, is tapped at 190, to energize a $(y-z)$ mc. amplifier 191, which controls an automatic frequency-controller 192 for the local-oscillator 15.

In other respects, the circuits and parts of the apparatus shown in FIG. 2 are, or may be, similar to those which have been shown and explained in connection with FIG. 1, except that the velocity-responsive range-forcing connection 143 of FIG. 1 has been omitted in FIG. 2.

The operation of the special or alternative velocity-finding and range-finding equipment of FIG. 2 is illustrated in FIG. 4, which plots the frequency against time. In FIG. 4, the transmitter-reference wave, as it appears in the conductor 175 of FIG. 2, is shown by the curve F175, with its sinusoidal portion F175' which comes into existence when frequency modulation is introduced at the time $t_0$. The echo-wave, as it appears in the conductor 170 in FIG. 2, is shown, in FIG. 4, by the curve F170, with its sinusoidal portion F170', which appears at the time $(T_R + T_{DL})$ after the commencement of frequency-modulation at the time $t_0$.

Assuming that the Doppler-frequency $d$ is in the echo-wave, in FIG. 4, the unmodulated portion F175 of the transmitter-reference wave has a frequency of $(y-z)$ mc., while the unmodulated portion F170 of the echo-wave has a frequency $$[(y \mp d) - (z + .456 \pm d')] \text{ mc.}$$

The difference between these two waves is the frequency $(.456 \pm d' \mp d)$ mc., as shown at F55 in FIG. 4, this being the frequency which appears in the conductor 55 in FIG. 2.

The velocity-searching modulation of the 456 kc. local-oscillator 35 of FIG. 2 is indicated, in FIG. 4, by the dotted line F170''. After the automatic equipment has been locked as to Doppler-reference frequency, $d'$ will be equal to $d$, and the differential frequency F55 will be 456 kc.

During the frequency-modulated transmission-period, while the delay-line 28 of FIG. 2 is being adjusted to search for the range of the target, the phase of the sinusoidal portion F170' of the receiver-wave will be displaced, as indicated by the dotted line F170''' in FIG. 4, this process continuing until the sinusoidal wave-portions F170' and F175' are in phase with each other, as shown in FIG. 4.

The relationship between the three time-periods, $T_M$, $T_R$ and $T_{DL}$, in FIG. 4, is as expressed in Equation 3, as will be obvious from an inspection of FIG. 4. The significance of this equation has already been discussed in the explanations which have been given in connection with the apparatus which is shown in FIG. 1.

Figures 5, 6:
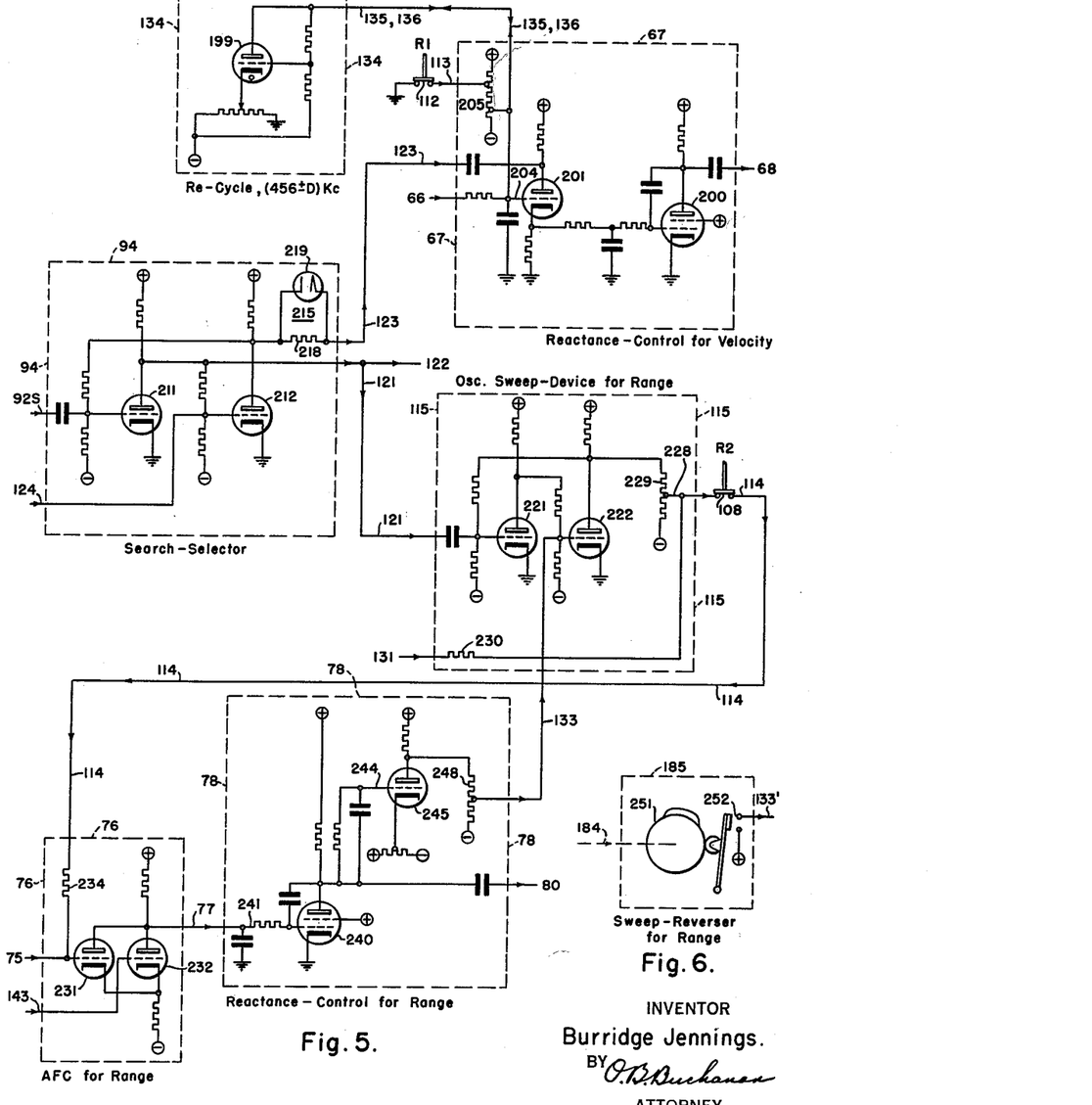
FIG. 5 is a circuit-diagram illustrative of suitable details of certain apparatus which is indicated only in block in FIG. 1.
FIG. 6 is a detail of the sweep-reverse block 185 of FIG. 2.

In FIG. 5, I have shown illustrative examples of satisfactory internal details of the blocks 67, 76, 78, 94, 115 and 134 of FIG. 1.

The recycling device 134 may consist simply of a thyratron-switch 199, which may be an adaption of the switching device and the principles of sweep-frequency control which are described in "Principles of Radar," by the Massachusetts Institute of Technology (M.I.T.), Radar School, 2d ed., 1946, pages 4–85 to 4–88; or the switching apparatus which is described in "Ultra-High- Frequency Techniques," by J. G. Brainerd and others, Van Nostrand, 1942, page 184.

The reactance-control device 67 consists essentially of a reactance-tube 200, which is controlled from a direct-current amplifier 201. The essential principles of the reactance-tube 200 are described in the Brainerd book at pages 280 and 281. The direct-current amplifier 201 is described in the same book at page 101. The zero-potential cut-off circuit 113 is made effective on the control-circuit 204 of the direct-current amplifier 201, through a potentiometer 205, in the illustrative form of embodiment shown in FIG. 5. The main input or control-circuit 66 of the reactance-control device 67 is connected to the grid-circuit 204 of the direct-current amplifier 201; and the main output-circuit 68 of the reactance-control device 67 is connected to the plate of the reactance-tube 200, in FIG. 5. The recycling control of the reactance-control device 67 may be controlled by a single conductor, marked 135, 136 in FIG. 5, this conductor being connected between the plate of the thyratron 199 of the recycling device 134, and the amplifier grid-circuit 204 of the reactance-control device 67.

The search-selector 94 is illustrated, in FIG. 5, as embodying an adaptation of the Eccles-Jordan switch-circuit which is described in the Brainerd publication at pages 171 to 175. It consists essentially of two triodes 211 and 212, which are controlled by the respective input-circuits 92S and 124. The plate-circuit of the triode 211 is used as the output-circuits 121 and 122, which may both have the same phase and the same voltage. The plate-circuit of the other triode 212 is connected, through a unilateral impedance-device 215, to the output-circuit 123, which has a phase opposite to the phase of the output-circuits 121 and 122, this phase-opposition being obtained by reason of the fact that the Eccles-Jordan trigger-circuit causes only one tube to pass plate-current at a time.

The unilateral impedance-device 215 consists of a capacitor-leakage resistance 218 which is shunted by a diode 219, so as to offer a low impedance (the impedance of the diode 219) when current is flowing out of the search-selector 94 in the circuit 123, while offering the high resistance of the resistor 218 against the reverse-flow of current in said circuit 123. The general features of such a unilateral impedance are well known and frequently used in the electrical art, as illustrated, for example, in the Willis Patent 1,935,464, granted November 14, 1933, for Electric Valve Circuits, referring to the elements 21, 22 and 26 of this patent.

The oscillator sweep-device 115 consists essentially of an adaptation of an Eccles-Jordan circuit which is similar to the circuit used in the search-selector 94. It comprises two triodes 221 and 222, which are controlled by the input-circuit 121 and the input-circuit 133, respectively. The output-circuit of the multivibrator is tapped off, at 228, from a potentiometer 229 which is connected to the plate of the triode 222. This output-circuit 228 leads to the back-contact 108 of the relay R2, and thence to the input-circuit 114 of the AFC device 76. The third input-circuit 131 of the sweep-device 115 is connected to the output-circuit 228 through a resistor 230.

The AFC device 76 may consist simply of two parallel-connected high-impedance direct-current amplifiers 231 and 232, which are controlled respectively by the input-circuits 75 and 143. The previously mentioned input-circuit 114 is also connected to the grid or control-circuit of the tube 231, but in series with a resistance 234, which makes the control-circuit 75 have the stronger signal, so that it will control the tube 231 whenever there is any substantial signal-voltage in the strong input-circuit 75. In this way, the sweep-device 115, through its output-circuit 114, can control the AFC device 76 only up to the time when the radar circuits lock onto a target. The AFC device 76 has an output-circuit 77 which is connected to the plates of the two tubes 231 and 232.

The reactance-control device 78 consists essentially of a reactance-tube 240, which may be similar to the reactance-tube 200 of the other reactance-control device 67. The grid-control circuit 241 of this tube is connected to the input or control-circuit 77. The main output 80 of the reactance-control device 78 is taken from the plate of the reactance-tube 240. The plate-circuit of said reactance-tube 240 is also used, in the illustrated example of the control-device 78, to energize the grid-circuit 244 of a direct-current amplifier 245, the plate-circuit of which is connected to the output-circuit 133 of the reactance-control device 78, through a potentiometer 248.

In FIG. 6, I have illustrated a possible construction of the range-searching sweep-reverser 185 of FIG. 2. This device may consist simply of a cam 251, which is driven by the mechanical connection 184, and which operates a switch 252 which is connected to the output-circuit 133'.

These details of the contents of certain of the blocks of the diagrams in FIGS. 1 and 2 are given only by way of illustration, as there are many forms and details of constructions which could be used for the designated purposes. It is believed that the essential contents of the other blocks will be understood by the skilled workers of the art, particularly in view of the illustrative blocks which have been detailed in FIGS. 5 and 6.

While I have shown only two illustrative forms of embodiment of my invention, and while I have discussed concrete limits and figures, by way of example, I wish it to be understood that I am not limited to these details, as the invention is susceptible of considerable modification, by way of substitutions of equivalents, omissions of unwanted details, or the addition of more details, as may be needed to meet the requirements of any particular situation. I desire, therefore, that the appended claims shall be accorded the broadest construction consistent with their language.

I claim as my invention:

1. A range-finding echo-wave device, comprising a continuous-wave transmitter-system, circuit-means for sending a continuous transmitted wave from said transmitter-system to a reflecting surface and for receiving an echo-wave from said reflecting surface, circuit-means for deriving a transmitter-reference wave from said transmitter-system, local-oscillator means for heterodyning both said echo-wave and said transmitter-reference wave, a first controlling-means comprising a delay-means in circuit with one of the two heterodyned waves, a second controlling-means comprising a frequency-modulator means for causing the transmitted wave of the transmitter-system to be frequency-modulated, means for mixing the two resulting heterodyned waves and for responding to the sum or difference of their frequencies, and discriminator-means for responding to frequency-deviations of the resulting mixed wave above and below a predetermined mean frequency.

2. The invention as defined in claim 1, in combination with phase-comparator means for comparing the phase of the frequency-modulations of the transmitted wave with the phase of an output of the discriminator-means, automatic range-finding control-means for so controlling one of said two controlling-means, in response to the output of said phase-comparator means, as to maintain a predetermined phase-relation as determined by said phase-comparator means, automatic range-signal searching means for controlling said automatic range-finding control-means to search for, and maintain, a target-range signal between a maximum limit beyond the practical response-limit of the echo-wave device and a minimum limit greater than zero, and range-signal responsive means, responsive to the automatic range-finding control accomplished by said automatic range-finding control-means, for determining the range of the reflecting surface.

3. The invention as defined in claim 1, characterized by said frequency-modulator means being operative to modulate the transmitted wave with a frequency-modulation of a repetitive wave-shape.

4. The invention as defined in claim 1, characterized by said frequency-modulator means being operative to modulate the transmitted wave with a substantially sine-wave frequency-modulation.

5. A velocity- and range-finding echo-wave device, comprising a continuous-wave transmitter-system, circuit-means for sending a continuous transmitted wave from said transmitter-system to a reflecting surface and for receiving an echo-wave from said reflecting surface, circuit-means for deriving a transmitter-reference wave from said transmitter-system, local-oscillator means for heterodyning both said echo-wave and said transmitter-reference wave, local-oscillator means for introducing a variable Doppler-reference frequency into one of the two circuits containing the respective heterodyned waves, a first controlling-means comprising a delay-means in the circuit containing one of the two heterodyned waves, a second controlling-means comprising a frequency-modulator means for causing the transmitted wave of the transmitter-system to be frequency-modulated, means for mixing the two resulting heterodyned waves and for responding to the sum or difference of their frequencies, discriminator-means for responding to frequency-variations of the resulting mixed wave above and below a predetermined mean frequency, automatic velocity-finding frequency-control means for controlling the variable Doppler-reference frequency, automatic frequency-searching means for varying the frequency-variation of said Doppler-reference frequency from a predetermined mean frequency, means responsive to an output of said discriminator-means for causing said automatic velocity-finding frequency-control means to hold the variation of the Doppler-reference frequency to a value which will hold the frequency of the mixed wave constant at its predetermined mean frequency, phase-comparator means for comparing the phase of the frequency-modulations of the transmitted wave with the phase of an output of the discriminator-means, automatic range-finding control-means for so controlling one of said controlling-means, in response to the output of said phase-comparator means, as to maintain a predetermined phase-relation as determined by said phase-comparator means, and automatic range-signal searching means for controlling said automatic range-finding control-means to search for, and maintain, a target-range signal between a maximum limit beyond the practical response-limit of the echo-wave device and a minimum limit greater than zero.

6. The invention as defined in claim 5, in combination with velocity-responsive means, responsive to the Doppler-reference frequency, for determining the line-of-sight velocity of the reflecting surface with respect to the echo-wave device, and range-responsive means, responsive to the automatic adjustment accomplished by said automatic range-finding control-means, for determining the range of the reflecting surface.

7. The invention as defined in claim 5, characterized by said automatic velocity-finding means being first operative to find an apparent target-velocity before said frequency-modulator means is set in operation, whereby the transmitted wave is a continuous unmodulated wave while the automatic velocity-finding means is finding the target-velocity, said automatic velocity-finding means having storage-facilities, whereby it can remain adjusted, for a brief time-period, to the last known target-velocity in case of a loss of signal, and means responsive to an output of said velocity-ending means for automatically initiating the operation of said frequency-modulator means.

8. The invention as defined in claim 5, characterized by said predetermined phase-relation being approximately zero, whereby the sum or difference-wave which is fed into the discriminator-means is substantially unmodulated when the range-finding device is operating on range.

9. A target-tracking echo-wave device, comprising a continuous-wave transmitter-system, circuit-means including a directional antenna-system for aiming a transmitted wave from said transmitter-system to a target and for receiving an echo-wave from said target, circuit-means for deriving a transmitter-reference wave from said transmitter-system, local-oscillator means for heterodyning both said echo-wave and said transmitter-reference wave, local-oscillator means for introducing a variable Doppler-reference frequency into one of the two circuits containing the respective heterodyned waves, a first controlling-means comprising a delay means in the circuit containing one of the two heterodyned waves, a second controlling-means comprising a frequency-modulator means for causing the transmitted wave of the transmitter-system to be frequency-modulated, means for mixing the two resulting heterodyned waves and for responding to the sum or difference of their frequencies, discriminator-means for responding to frequency-variations of the resulting mixed wave above and below a predetermined mean frequency, automatic velocity-finding frequency-control means for controlling the variable Doppler-reference frequency, automatic frequency-searching means for varying the frequency-variation of said Doppler-reference frequency from a predetermined mean frequency, means responsive to an output of said discriminator-means for causing said automatic velocity-finding frequency-control means to hold the variation of the Doppler-reference frequency to a value which will hold the frequency of the mixed wave constant at its predetermined mean frequency, phase-comparator means for comparing the phase of the frequency-modulations of the transmitted wave with the phase of an output of the discriminator-means, automatic range-finding control-means for so controlling one of said controlling-means, in response to the output of said phase-comparator means, as to maintain a predetermined phase-relation as determined by said phase-comparator means, automatic range-signal searching means for controlling said automatic range-finding control-means to search for, and maintain, a target-range signal between a maximum limit beyond the practical response-limit of the echo-wave device and a minimum limit greater than zero, automatic detector-means for detecting a target which is being tracked as to both line-of-sight velocity and range, and automatic antenna-aiming means, responsive to said detector-means, for so controlling the azimuth and the elevation of said directional antenna-system as to track the target in azimuth and elevation.

10. The invention as defined in claim 9, in combination with velocity-responsive means, responsive to the Doppler-reference frequency, for continuously giving information as to the line-of-sight velocity of the target with respect to the echo-wave device, range-responsive means, responsive to the automatic adjustment accomplished by said automatic range-finding control-means, for continuously giving information as to the range of the target, and azimuth- and elevation-responsive means, responsive to the antenna-aiming means, for continuously giving information as to the azimuth and elevation of the target.

11. The invention as defined in claim 9, characterized by said automatic velocity-finding means being first operative to find an apparent target-velocity before said frequency-modulator means is set in operation, whereby the transmitted wave is a continuous unmodulated high-frequency wave while the automatic velocity-finding means is finding the target-velocity, said automatic velocity-finding means having storage-facilities, whereby it can remain adjusted, for a brief time-period, to the last known target-velocity in case of a loss of signal.

12. The invention as defined in claim 9, characterized by said predetermined phase-relation being approximately zero.

References Cited in the file of this patent

UNITED STATES PATENTS

| | | |
|---|---|---|
| 2,409,448 | Rost | Oct. 15, 1946 |
| 2,414,108 | Knowles | Jan. 14, 1947 |
| 2,420,264 | Rost | May 6, 1947 |
| 2,424,796 | Carlson | July 29, 1947 |
| 2,433,681 | Blumlein | Dec. 30, 1947 |
| 2,444,171 | Sanders | June 29, 1948 |
| 2,491,029 | Brunn | Dec. 13, 1949 |
| 2,517,540 | Busignies | Aug. 8, 1950 |

FOREIGN PATENTS

| | | |
|---|---|---|
| 582,503 | Great Britain | Nov. 19, 1946 |